US009473701B2

(12) United States Patent
Tsuda (10) Patent No.: US 9,473,701 B2
(45) Date of Patent: Oct. 18, 2016

(54) ELECTRONIC CAMERA

(71) Applicant: NIKON CORPORATION, Tokyo (JP)

(72) Inventor: Yutaka Tsuda, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/642,185

(22) Filed: Mar. 9, 2015

(65) Prior Publication Data

US 2015/0181119 A1    Jun. 25, 2015

Related U.S. Application Data (63) Continuation of application No. 13/086,863, filed on Apr. 14, 2011, now abandoned.

(30) Foreign Application Priority Data

Apr. 15, 2010 (JP) .................................. 2010-094317

(51) Int. Cl.
    *H04N 5/232* (2006.01)
    *H04N 1/21* (2006.01)
    *H04N 101/00* (2006.01)

(52) U.S. Cl.
    CPC ........ *H04N 5/23241* (2013.01); *H04N 1/2141* (2013.01); *H04N 5/23222* (2013.01); *H04N 5/23245* (2013.01); *H04N 2101/00* (2013.01)

(58) Field of Classification Search
    CPC .................... H04N 5/23241; H04N 5/23222; H04N 5/23245; H04N 1/2141; H04N 2101/00
    See application file for complete search history.

(56) References Cited

U.S. PATENT DOCUMENTS

| 5,523,788 | A  | * | 6/1996  | Kannegundla | H04N 5/335 |
|           |    |   |         |             | 348/222.1  |
| 7,015,966 | B1 | * | 3/2006  | Lin         | H04N 5/3415 |
|           |    |   |         |             | 348/315    |
| 7,978,228 | B2 |   | 7/2011  | Fujisawa et al. | |
| 2005/0117029 | A1 | | 6/2005 | Shiomi | |
| 2005/0237422 | A1 | * | 10/2005 | Kido | H04N 3/1537 |
|           |    |   |         |             | 348/362    |
| 2007/0053664 | A1 | * | 3/2007 | Sugeno | H04N 5/232 |
|           |    |   |         |             | 386/224    |

(Continued)

FOREIGN PATENT DOCUMENTS

| CN | 1622598 A    | 6/2005  |
| JP | H05-227519 A | 9/1993  |
| JP | 2008-219319 A | 9/2008 |
| JP | 2009-232003 A | 10/2009 |

OTHER PUBLICATIONS

May 15, 2012 Office Action issued in Japanese Patent Application No. 2010-094317.

(Continued)

*Primary Examiner* — Jason Flohre
(74) *Attorney, Agent, or Firm* — Oliff PLC (57) ABSTRACT

An imaging element which continuously outputs image data obtained by photoelectrically converting object light, a buffer memory which temporarily stores image data being output from the imaging element, a plurality of image processing units which are capable of performing image processing on image data output from the imaging element, and a control unit which causes an image processing unit of the plurality of image processing units to operate based on a number of pieces of the image data stored in the buffer memory when the image data is output continuously from the imaging element, in which the image processing unit performs image processing on each piece of image data output continuously.

18 Claims, 3 Drawing Sheets

(56) References Cited

U.S. PATENT DOCUMENTS

| | | | |
|---|---|---|---|
| 2007/0091204 A1 | 4/2007 | Koshimizu et al. | |
| 2007/0097242 A1* | 5/2007 | Oshima | H04N 3/1575 348/312 |
| 2009/0237528 A1 | 9/2009 | Kawamura et al. | |
| 2009/0274365 A1* | 11/2009 | Tsuda | G06T 3/4007 382/166 |
| 2010/0157090 A1* | 6/2010 | Kobayashi | H04N 5/77 348/222.1 |
| 2010/0253803 A1* | 10/2010 | Ise | H04N 5/232 348/222.1 |
| 2010/0295966 A1 | 11/2010 | Furlan | |
| 2011/0292228 A1* | 12/2011 | Toyoda | H04N 5/772 348/220.1 |

OTHER PUBLICATIONS

Oct. 9, 2014 Office Action issued in U.S. Appl. No. 13/086,863.
Jan. 16, 2014 Office Action issued in U.S. Appl. No. 13/086,863.
Nov. 12, 2015 Office Action issued in Chinese Patent Application No. 201110095265.0.

* cited by examiner

ELECTRONIC CAMERA

CROSS REFERENCE TO RELATED APPLICATIONS

This is a Continuation of application Ser. No. 13/086,863 filed Apr. 14, 2011, which claims the benefit of priority from Japanese Patent Application No. 2010-094317, filed on Apr. 15, 2010, the entire contents of which are incorporated herein by reference.

BACKGROUND

1. Field

The present application relates to an electronic camera that performs image processing on image data obtained by shooting.

2. Description of the Related Art

Conventionally, in an electronic camera such as a digital camera, there are provided a continuous shooting mode in which a plurality of still images is obtained continuously based on a frame rate set in advance, a moving image mode in which a moving image is obtained, etc., in addition to a shooting mode in which one still image is obtained. In a digital camera comprising such a continuous shooting mode and a moving image mode, image data is output at regular intervals from an imaging element, and thus, if processing capacity relating to image processing or coding processing for output image data is low, processing time required for the processing increases and as a result, processing on image data not subjected to processing yet is performed even after shooting has been completed. Because of this, it is devised that two image processing units that perform image processing are arranged in parallel and image processing on image data is performed while distributing image data output from the imaging element to the image processing units, respectively (see Japanese Unexamined Patent Application Publication No. H5-227519). Because of this, the image processing capacity is improved and the processing time required for image processing is reduced.

In contrast, a large amount of electric power is consumed in the image processing for obtained image data, and thus, if image processing is performed by using the above-described two image processing units, more electric power is consumed. Furthermore, the provision of two image processing units is effective for image processing at the time of continuous shooting and movie shooting, but at the time of shooting of a still image, image processing can be performed by one of the image processing units and the other image processing unit does not perform any image processing, and thus, electric power is wasted.

SUMMARY

A proposition of the present embodiment is to provide an electronic camera capable of preventing electric power from being wasted when a plurality of image processing units is used.

In order to solve the above-described problems, an electronic camera of the present embodiment is characterized by including an imaging element which continuously outputs image data obtained by photoelectrically converting object light, a buffer memory which temporarily stores image data being output from the imaging element, a plurality of image processing units which are capable of performing image processing on image data output from the imaging element, and a control unit which causes an image processing unit of the plurality of image processing units to operate based on a number of the pieces of the image data stored in the buffer memory when image data is output continuously from the imaging element, in which the image processing unit performs image processing on each piece of image data output continuously.

In addition, it is preferable that the plurality of the image processing units include a first image processing unit which operates regardless of an output state of the image data output from the imaging element and a second image processing unit operated by the control unit, and the control unit causes the second image processing unit to operate based on the number of pieces of the image data stored in the buffer memory.

Furthermore, it is preferable that the control unit causes the image processing unit that performs image processing on each piece of the image data output continuously to operate based on a result of a comparison between the number of pieces of the image data stored in the buffer memory and a threshold value set in advance.

Moreover, it is preferable that the control unit causes the image processing unit that performs image processing on each piece of the image data output continuously to operate when the number of pieces of the image data stored in the buffer memory exceeds the threshold value.

Furthermore, an electronic camera of the present embodiment is characterized by including an imaging element which continuously outputs image data obtained by photoelectrically converting object light, a plurality of image processing units which are capable of performing image processing on image data output from the imaging element, and a control unit which causes an image processing unit of the plurality of the image processing units to operate based on an output interval of the image data when the image data is output continuously from the imaging element, in which the image processing unit performs image processing on each piece of image data output continuously.

Moreover, it is preferable that the plurality of the image processing units include a first image processing unit which operates regardless of an output state of the image data output from the imaging element and a second image processing unit operated by the control unit, and the control unit causes the second image processing unit to operate based on the output interval of the image data.

In addition, it is preferable that the control unit causes the image processing unit that performs image processing on each piece of the image data output continuously to operate based on a result of a comparison between the output interval of the image data and a threshold value set in advance.

Furthermore, it is preferable that the control unit causes the image processing unit that performs image processing on each piece of the image data output continuously to operate when the output interval of the image data is less than or equal to the threshold value.

Moreover, it is preferable that the output interval of the image data is obtained by measuring a time from a vertical synchronizing signal output at the time of start of imaging to a vertical synchronizing signal to be output next.

In addition, it is preferable to include a setting operation unit to be operated when setting the output interval of the image data.

Furthermore, an electronic camera of the present embodiment is characterized by including an imaging element which continuously outputs image data obtained by photoelectrically converting object light, a plurality of image processing units which are capable of performing image processing on image data output from the imaging element, and a control unit which causes an image processing unit of the plurality of image processing units to operate based on an output resolution of the image data output from the imaging element when the image data is output continuously from the imaging element, in which the image processing unit performs image processing on each piece of image data output continuously.

Moreover, it is preferable that the plurality of image processing units include a first image processing unit which operates regardless of an output state of image data output from the imaging element and a second image processing unit operated by the control unit, and the control unit causes the second image processing unit to operate based on the output resolution of the image data.

Furthermore, it is preferable that the control unit causes the image processing unit that performs image processing on each piece of the image data output continuously to operate based on a result of a comparison between the output resolution of the image data and a threshold value set in advance.

In addition, it is preferable that the control unit causes the image processing unit that performs image processing on each piece of the image data output continuously to operate when the output resolution of the image data exceeds the threshold value.

Furthermore, it is preferable that the control unit stops the image processing unit operated by the control unit when image processing is completed in at least each of the image processing units operated.

DETAILED DESCRIPTION OF EMBODIMENTS

<First Embodiment>

Figure 1:
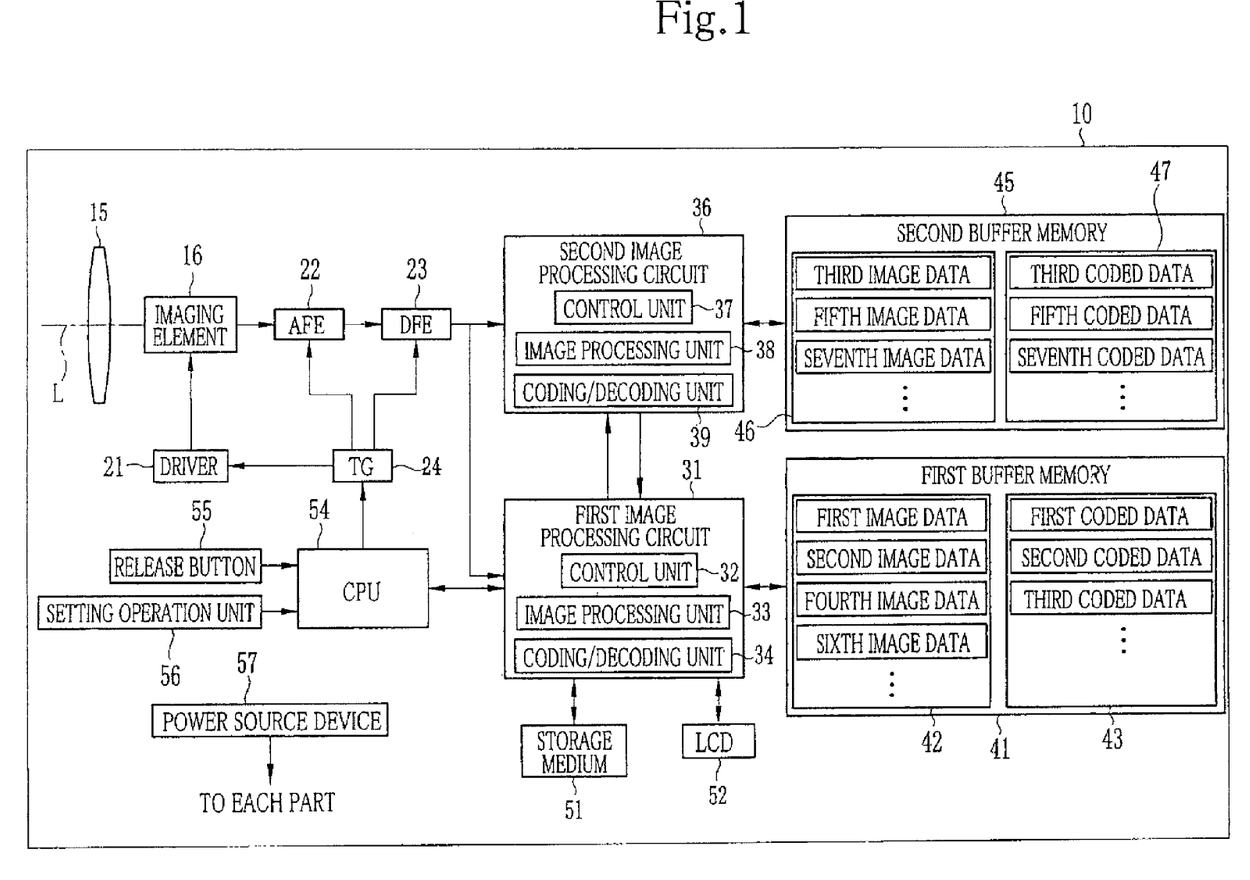
FIG. 1 is a diagram showing an outline of a configuration of a digital camera using the present embodiment.

FIG. 1 shows an example of a digital camera using the present invention. It is made possible for a digital camera 10 of the present invention to perform movie shooting to obtain a moving image in addition to still image shooting to obtain one still image at the time of operation of a release button 55, to be described later, continuous shooting to continuously obtain a predetermined number of still images at regular intervals at the time of full-press operation of the release button 55, to be described later. Explanation will be given below on the assumption that a mode to perform still image shooting is referred to as a still image mode, a mode to perform continuous shooting as a continuous shooting mode, and a mode to perform movie shooting as a moving image mode. Furthermore, explanation is given on the assumption that an action to obtain an image by the digital camera 10 is referred to as shooting and the internal processing of the digital camera 10 performed at the time of shooting as imaging.

As already known, the digital camera 10 photoelectrically converts object light taken in by an imaging optical system 15 through the use of an imaging element 16 and obtains image data from an electric signal after the photoelectric conversion. The imaging optical system 15 includes a lens group including a zoom lens, a focus lens, etc., not shown schematically. The zoom lens and focus lens are moved in the direction of an optical axis L by a lens drive mechanism, not shown schematically.

The imaging element 16 includes, for example, a CCD (Charge Coupled Device), CMOS (Complementary Metal-Oxide Semiconductor), etc. The drive of the imaging element 16 is controlled by a driver 21. The control of the drive of the imaging element 16 includes the control of accumulation of signal charges and output of accumulated signal charges, in each pixel of the imaging element 16. Explanation will be given below on the assumption that a signal charge output from the imaging element 16 is referred to as an image signal. Furthermore addition to the above, the driver 21 controls whether to drive all the pixels or part of the pixels of the imaging element 16. That is, at the time of shooting, an image signal is obtained by driving all the pixels of the imaging element 16 and at the time of non-shooting, an image signal is obtained by selectively using part of the pixels of the imaging element 16, that is, by so-called thinning control.

An AFE (Analog Front End) circuit 22 is configured to include an AGC circuit and a CDS circuit, not shown schematically. The AFE circuit 22 converts an analog signal into a digital signal by an A/D conversion circuit, not shown schematically, after performing analog processing, such as gain control and noise removal, on an input image signal. The digital image signal is output to a DFE circuit 23.

The DFE (Digital Front End) circuit 23 performs noise correction processing and defect correction processing on an input image signal. The image signal having been subjected to the processing is output to a first image processing circuit 31 and a second image processing circuit 36, respectively. Explanation is given below on the assumption that an image signal to be input to the first image processing circuit 31 and the second image processing circuit 36, respectively, is referred to as image data. Reference numeral 24 represents a timing generator (TG) and upon receipt of an output of a timing pulse of the TG 24, the operations of the driver 21, the AFE circuit 22, and the DFE circuit 23 are synchronized.

The first image processing circuit 31 starts to operate when the main power source of the digital camera 10 is turned on and stops its operation when the main power source of the digital camera 10 is turned off. The first image processing circuit 31 performs image processing and coding processing on image data stored in a first buffer memory 41 and at the same time, performs decoding processing on decoded data in an image file stored in a storage medium 51 and image processing for image data having been subjected to decoding processing. The first image processing circuit 31 has functions of a control unit 32, an image processing unit 33, and a coding/decoding unit 34.

The control unit 32 supplies electric power from a power source device 57 to the first buffer memory 41 as well as to the image processing unit 33, the coding/decoding unit 34. Furthermore, the control unit 32 outputs a clock pulse to the first buffer memory 41 as well as to the image processing unit 33 and the coding/decoding unit 34. Because of this, the operation of each part of the first image processing circuit 31 and the first buffer memory 41 is controlled by the control unit 32. Moreover, the control unit 32 outputs an operation signal or an operation stop signal to the second image processing circuit 36. Because of this, the second image processing circuit 36 is switched between a state where it operates (hereinafter, referred to as an operation state) and a state where its operation is stopped (hereinafter, referred to as a standby state).

The image processing unit 33 performs image processing, such as white balance processing, color interpolation processing, gamma processing, and contour enhancement processing, on image data stored in a first storage region 42. This processing is already known, and thus, its details are omitted here.

The coding/decoding unit 34 compresses and codes image data having been subjected image processing by the image processing unit 33. The compressed and coded image data is referred to as coded data hereinafter. The decoded data is written to a second storage region 43 of the first buffer memory 41. When image data obtained in the continuous shooting mode and the moving image mode is input, a plurality of pieces of image data is input, and thus, in these modes, image data and coded data are managed by an output number etc. The coding/decoding unit 34 generates image data by decoding coded data read from the storage medium 51.

The second image processing circuit 36 switches between the standby state and the operation state upon receipt of the operation signal or the operation stop signal from the first image processing circuit 31. For example, in the standby state, electric power is supplied only to a control unit 37, to be described later, and no electric power is supplied to an image processing unit 38 or coding/decoding unit 39. Because of this, even if image data from the DFE circuit 23 is input, this image data is invalid data that is not written to a second buffer memory 45. In contrast, in the operation state, electric power is supplied to the image processing unit 38 and the coding/decoding unit 39 in addition to the control unit 37. In this case, for example, every two pieces of image data to be input is handled as valid image data and written to the second buffer memory 45. Image data not to be written to the second buffer memory 45 is invalid image data.

Like the first image processing circuit 31, the second image processing circuit 36 includes the control unit 37, the image processing unit 38, and the coding/decoding unit 39. The functions of the image processing unit 38 and the coding/decoding unit 39 in the second image processing circuit 36 are the same as the functions of the image processing unit 33 and the coding/decoding unit 34 in the first image processing circuit 31, respectively, and thus, their details are omitted here. The processing capacity of the image processing according to the image processing unit 38 is the same as the processing capacity of the image processing according to the first image processing circuit 31.

The control unit 37 controls each part of the second image processing circuit 36 by outputting a clock pulse as well as supplying electric power from the power source device 57 to the image processing unit 38 and the coding/decoding unit 39. It should be noted that to the control unit 37, electric power is supplied from the power source device 57 even in the standby state. Because of this, it is made possible to identify an operation signal input from the first image processing circuit 31 even if the second image processing circuit 36 is in the standby state. It should be noted that when the second image processing circuit 36 is in the standby state, no electric power is supplied to the image processing unit 38 or the coding/decoding unit 39, and thus, processing is not performed on each of these parts. Furthermore, even if the second image processing circuit 36 is in the standby state, image data from the DFE circuit 23 is input, but the control unit 37 processes input image data as invalid data. Moreover, upon receipt of the operation signal from the first image processing circuit 31, the control unit 37 starts to supply electric power to each part of the second image processing circuit 36 and the second buffer memory 45 and at the same time, outputs a clock pulse to the image processing unit 38, the coding/decoding unit 39, and the second buffer memory 45. Because of this, the operation of each part of the first image processing circuit 31 and the operation of the first buffer memory 41 are controlled by the control unit 32.

Furthermore, the control unit 37 reads coded data stored in a second storage region 47 of the second buffer memory 45 and outputs it to the first image processing circuit 31 when image processing and coding processing are performed on all the image data stored in the first storage region 46 of the second buffer memory 45. This coded data is stored in the second storage region 43 of the first buffer memory 41 via the first image processing circuit 31. When all the coded data stored in the second buffer memory 45 is output to the first image processing circuit 31, an operation stop signal is input from the first image processing circuit 31. Upon receipt of the operation stop signal, the control unit 37 stops outputting of a clock pulse to the image processing unit 38, the coding/decoding unit 39, and the second buffer memory 45 and stops the supply of electric power thereto. Because of this, the operations of the image processing unit 38, the coding/decoding unit 39, and the second buffer memory 45 are stopped. That is, the second image processing circuit 36 switches from the operation state to the standby state.

The first buffer memory 41 includes the first storage region 42 and the second storage region 43. In the first storage region 42, image data output from the DFE circuit 23 is stored. In contrast, in the second storage region 43, coded data generated by the first image processing circuit 31 is stored. Furthermore, in the second storage region 43, coded data input to the first image processing circuit 31 via the second image processing circuit 36 is also stored. It should be noted that similarly, the second buffer memory 45 also includes the first storage region 46 and the second storage region 47. Data stored in these storage regions is the same as that in the first buffer memory 41.

In the storage medium 51, a still image file and a moving image file are stored. These image files include image files in which coded data stored in the first buffer memory 41 described above and additional information, such as information about shooting conditions, shooting date, and the type of the digital camera 10, etc., are combined.

An LCD 52 is one form. of a display device and displays a through image or an image obtained at the time of shooting. It should be noted that an image obtained at the time of shooting includes, for example, a thumbnail image. The thumbnail image is an image generated by performing reduction processing on image data obtained by shooting. Furthermore, in addition to the above, the LCD 52 displays an image for setting used to make settings of the digital camera 10.

A CPU 54 totally controls each part of the digital camera 10 by executing a control program, not shown schematically. To the CPU 54, the release button 55, a setting operation unit 56, etc., are connected and the CPU 54 controls each part of the digital camera 10 based on the operation request by these operation members and the control program. For example, when the release button 55 is operated, after AE processing and AF processing are performed, imaging processing is performed under the exposure condition determined by the AE processing. Furthermore, when the setting operation unit 56 is operated, it is possible to change various settings in the digital camera 10. At the time of the setting, any of the shooting modes is selected or the reproduction mode is selected, and a frame rate value in the continuous shooting mode or moving image mode is set.

When the main power source of the digital camera 10 is turned on, the power source device 57 supplies electric power to each part of the digital camera 10. Moreover, when the main power source of the digital camera 10 is turned off, the power source device 57 stops the supply of electric power to each part of the digital camera 10.

Figure 2:
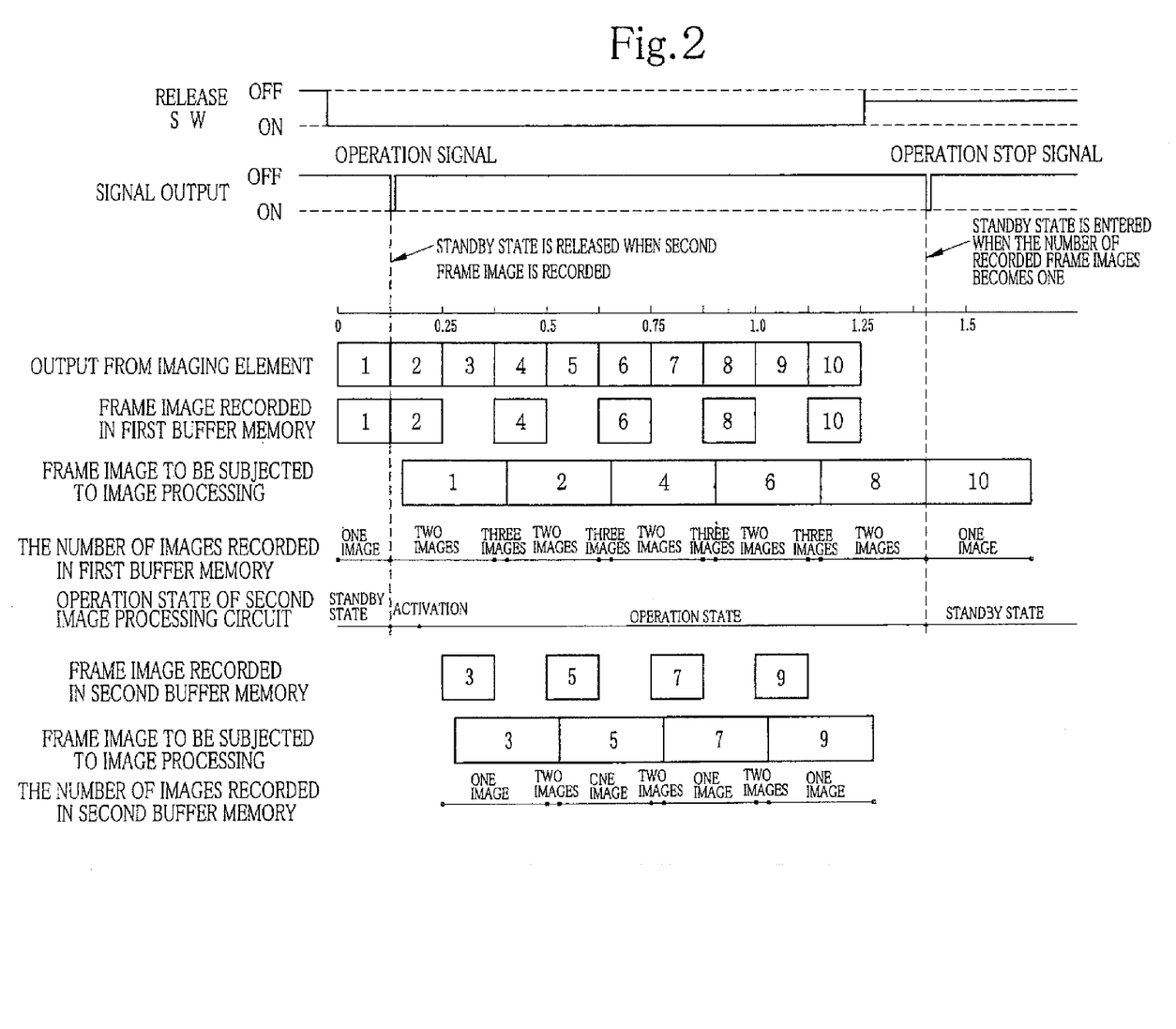
FIG. 2 is a timing chart at the time of shooting in a continuous shooting mode in a first embodiment.

Next, the flow of processing in the first image processing circuit 31 and the second image processing circuit 36 when shooting is performed in the continuous shooting mode in the first embodiment is explained using the timing chart in FIG. 2. It should be noted that in the timing chart in FIG. 2, a case is explained, where 10 images are shot continuously in the continuous shooting mode at a frame rate value of 8 fps. Meanwhile, a frame image in FIG. 2 corresponds to image data shown in FIG. 1. That is, a frame image 1 corresponds to first image data shown in FIG. 1 and a frame image 2 corresponds to second image data shown in FIG. 1, respectively. Immediately before the timing chart in FIG. 2 is performed, the second image processing circuit 36 is in the standby state.

When the release button 55 is operated, a release switch (SW) is turned ON and after AE processing and AF processing are performed, shooting is performed under the shooting conditions set by the AE processing. It should be noted that because of the shooting in the continuous shooting mode, the above-described imaging is performed continuously a plurality of times based on the frame rate value set in advance. At each time of the imaging performed a plurality of times, the signal charge photoelectrically converted in the imaging element 16 is output from the imaging element 16 to the AFE circuit 22 as an image signal. The image signal input to the AFE circuit 22 is subjected to analog processing, such as gain control and noise removal, and converted into a digital signal. After that, the image signal converted into the digital signal is output to the DFE circuit 23 from the AFE circuit 22. The image signal converted into the digital signal is output to the first image processing circuit 31 and the second image processing circuit 36, respectively, after having been subjected to noise correction processing and defect correction processing in the DFE circuit 23. It should be noted that because the second image processing circuit 36 is in the standby state, the image signal input from the DFE circuit 23 to the second image processing circuit 36 is an invalid signal (data).

In contrast, the image data input to the first image processing circuit 31 is written to the first storage region 42 of the first buffer memory 41. For example, when the image signal is one obtained by the first imaging, the number of pieces of image data stored in the first storage region 42 of the first buffer memory 41 is 1.

Then, when 0.125 seconds elapse after the first imaging, the second imaging is performed. Image data based on the second imaging is written to the first storage region 42 of the first buffer memory 41 via the first image processing circuit 31. Because of this, the number of pieces of image data stored in the first storage region 42 of the first buffer memory 41 is 2.

The control unit 32 checks N, which is the number of pieces of image data stored in the first storage region 42 of the first buffer memory 41. The control unit 32 makes a determination by comparison between the number of pieces of image data N within the first storage region 42 and a threshold value No (in the present embodiment, No=1).

For example, in the above-described determination by comparison, when the control unit 32 determines that the number of pieces of image data N within the first storage region 42 is equal to or less than the threshold value No, it indicates that image data to be obtained newly is input to the first image processing circuit 31 after image processing for the image data has been completed. That is, it is possible to perform the image processing on the image data obtained continuously in the continuous shooting mode only in the first image processing circuit 31. In this case, the first image processing circuit 31 does not output the operation signal toward the second image processing circuit 36. As a result of this, the second image processing circuit 36 enters the standby state.

In contrast, when the control unit 32 determines that the number of pieces of image data N exceeds the threshold value No, it indicates that image data to be obtained newly is input to the first image processing circuit 31 before the image processing for the image data is completed. This case indicates that the rate of image processing in the first image processing circuit 31 cannot keep pace with the rate at which the image data is written to the first buffer memory 41, that is, it is not possible to keep pace only by the image processing in the first image processing circuit 31. In this case, the control unit 32 outputs the operation signal toward the second image processing circuit 36.

Upon receipt of the operation signal from the first image processing circuit 31, the control unit 37 switches the standby state of the second image processing circuit 36 to the operation state. It should be noted that "activation" in FIG. 2 represents processing to switch the standby state to the operation state. During the period of this processing time, the control unit 37 supplies electric power to the image processing unit 38, the coding/decoding unit 39. At the same time, the control unit 37 supplies electric power to the second buffer memory 45. Furthermore, the control unit 37 outputs a clock pulse to the image processing unit 38, the coding/decoding unit 39, and the second buffer memory 45. Because of this, the second image processing circuit 36 and the second buffer memory 45 are operated.

For example, when the activation time of the second image processing circuit 36 is shorter than the output interval of image data, the second image processing circuit 36 causes the first storage region 46 of the second buffer memory 45 to store image data obtained by the third imaging. In contrast, the activation time of the second image processing circuit 36 is stored in advance in the first image processing circuit 31, and thus, when the image data obtained is input to the first image processing circuit 31 after the second image processing circuit 36 is switched to the operation state, the image data is processed as invalid data.

After that, image data obtained by the fourth, sixth, eighth, and tenth imaging is stored in the first buffer memory 41 and image data obtained by the fifth, seventh, and ninth imaging is stored in the second buffer memory 45. That is, image data obtained by the third and latter imaging is stored alternately. It should be noted that in FIG. 1, the image data obtained by the first imaging is described as first image data, image data obtained by the second imaging is described as second image data, and so on. Furthermore, the coded data corresponding to the image data is represented as first coded data, second coded data, and the like.

When the image data is written to any of the first buffer memory 41 and the second buffer memory 45 also, the image processing and coding processing by the first image processing circuit 31 and the second image processing circuit 36 are performed. For example, in the first image processing circuit 31, when image data obtained by the second imaging is recorded in the first buffer memory 41, the image processing for the image data obtained by the first imaging is started. Then, when the image processing is completed, the coding processing by the coding/decoding unit 33 is performed and coded data is generated. It should be noted that the coded data is stored in the second storage region 43 of the first buffer memory 41. Following this, image data from which the coded data is generated is deleted.

Afterward, in the step in which image processing in the first image processing circuit 31 is performed, new image data is written to the first storage region 42 of the first buffer memory 41. That is, the first storage region 42 of the first buffer memory 41 is required only to have a capacity large enough to store three pieces of image data, and thus, it is made possible to save the capacity of the first buffer memory 41. Similarly, in the second image processing circuit 36, in the step in which image processing for the image data obtained by the third imaging is performed, image data obtained by the fifth imaging is stored in the first storage region 46 of the second buffer memory 45. That is, in the step in which image processing in the second image processing circuit 36 is performed, new image data is written to the first recording region 46 of the second buffer memory 45. In the first storage region 46 of the second buffer memory 45, up to two pieces of image data are stored, and thus, the first storage region is required only to have a capacity large enough to store two pieces of image data.

When image processing for the image data stored in the first storage region of the corresponding buffer memory is performed in the first image processing circuit 31 and the second image processing circuit 36, respectively, image processing and coding processing in, for example, the second image processing circuit 36 are completed earlier. When the coding processing is completed in the second image processing circuit 36, the second image processing circuit 36 reads coded data stored in the second storage region 47 of the second buffer memory 45 and outputs it to the first image processing circuit 31. The first image processing circuit 31 writes the input coded data to the second storage region 43 of the first buffer memory 41. Then, when the image processing and coding processing in the first image processing circuit 31, and write of the coded data from the second image processing circuit 36 to the second storage region 43 of the first buffer memory 41 are completed, the control unit 32 of the first image processing circuit 31 outputs the operation stop signal to the second image processing circuit 36.

Upon receipt of the operation stop signal from the first image processing circuit 31, the control unit 37 of the second image processing circuit 36 stops the supply of a clock pulse to the image processing unit 38, the coding/decoding unit 39, and the second buffer memory 45 and stops the supply of electric power to the image processing unit 38, the coding/decoding unit 39, and the second buffer memory 45.

It should be noted that when the number of pieces of image data N within the first storage region 42 is equal to or less than the threshold No, that is, when continuous shooting at a low frame rate is performed or when shooting in the still image mode is performed, the second image processing circuit 36 remains in the standby state and no electric power is supplied to the image processing unit 38 and the coding/decoding unit 39 of the second image processing circuit 36, and thus, it is made possible to prevent electric power from being wasted. As described above, when the primary battery or secondary battery is used as a power source device, it is made possible to lengthen the lifetime of these batteries. Furthermore, the second image processing circuit 36 is brought into the standby state, and thus, it is possible to reduce the amount of heat generated from the circuit involved in image processing and to suppress the deformation of the interior of the digital camera or the risk of burn. Moreover, because it is possible to keep to a minimum the capacity of the first buffer memory 41 and the first storage region 46 of the first storage region 42, and thus, it is also possible to reduce the total capacity of the buffer memory.

<Second Embodiment>

A second embodiment of the present invention will be explained below using the drawings. Meanwhile, the second embodiment is a modification of the first embodiment in which the basis for determination of control is different, and thus, only parts different from those in the first embodiment are explained. Furthermore, the same configuration as that of the first embodiment is explained by using the same symbol.

Figure 3:
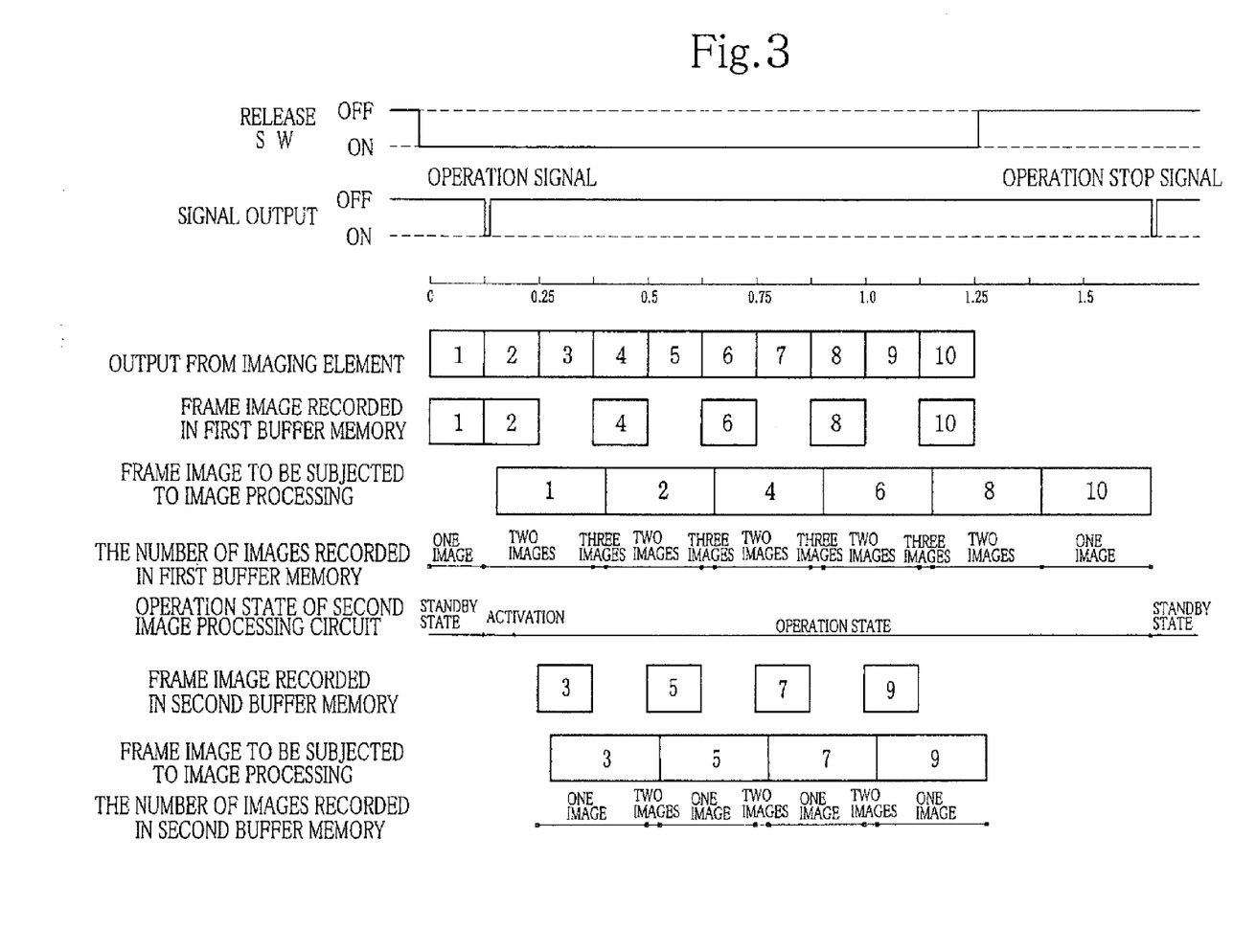
FIG. 3 is a timing chart at the time of shooting in a continuous shooting mode in a second embodiment.

Next, the flow of processing in the first image processing circuit 31 and the second image processing circuit 36 when shooting is performed in the continuous shooting mode in the second embodiment is explained using the timing chart in FIG. 3. Meanwhile, in the timing chart in FIG. 3, a case is explained, where 10 images are shot continuously in the continuous shooting mode at a frame rate value of 8 fps. Each frame image in FIG. 3 corresponds to each piece of image data shown in FIG. 1. That is, the frame image 1 corresponds to the first image data shown in FIG. 1 and the frame image 2 corresponds to the second image data shown in FIG. 1, respectively. It should be noted that immediately before the timing chart in FIG. 3 is performed, the second image processing circuit 36 is in the standby state.

Then, as in the first embodiment, starting from the operation of the release button 55, imaging is performed and image data input to the first image processing circuit 31 is written to the first storage region 42 of the first buffer memory 41. For example, when the image signal is one obtained by the first imaging, the number of pieces of image data stored in the first storage region 42 of the first buffer memory 41 is 1. Triggered by this, the control unit 32 of the first image processing circuit 31 starts to measure time.

Then, when 0.125 seconds elapse after the first imaging, the second imaging is performed. Image data based on the second imaging is written to the first storage region 42 of the first buffer memory 41 via the first image processing circuit 31. Because of this, the number of pieces of image data stored in the first storage region 42 of the first buffer memory 41 is 2. At the same time, the control unit 32 stops measuring of time.

The control unit 32 calculates an output interval T of the image data by finding the time when measuring of time is stopped, in other words, a time elapsed from when the image signal obtained by the first imaging is input to the first buffer memory 41 to when the image signal obtained by the second imaging is input to the first buffer memory 41. The control unit 32 makes a determination by comparison between the output interval T of the image data and a threshold value To. It should be noted that the threshold value To is a processing time required for the image processing of image data in the first image processing circuit 31.

For example, in the above-described determination by comparison, if the control unit 32 determines that the output interval T of the image data exceeds the threshold value To, this indicates that the image data to be obtained newly is input to the first image processing circuit 31 after the image processing for the image data has been completed. That is, it is possible to perform the image processing on the image data obtained continuously in the continuous shooting mode only in the first image processing circuit 31. In this case, the first image processing circuit 31 does not output the operation signal toward the second image processing circuit 36. As a result of this, the second image processing circuit 36 enters the standby state.

In contrast, when the control unit 32 determines that the output interval T is equal to or less than the threshold value To, this indicates that the image data to be obtained newly is input to the first image processing circuit 31 before the image processing for the image data is completed. This case indicates that the rate of the image processing in the first image processing circuit 31 cannot keep pace with the rate at which image data is written to the first buffer memory 41, that is, it is not possible to keep pace only by the image processing in the first image processing circuit 31. In this case, the control unit 32 outputs the operation signal toward the second image processing circuit 36.

Upon receipt of the operation signal from the first image processing circuit 31, the control unit 37 switches the standby state of the second image processing circuit 36 to the operation state. It should be noted that "activation" in FIG. 3 represents the processing to switch the standby state to the operation state. During the period of this processing time, the control unit 37 supplies electric power to the image processing unit 38, the coding/decoding unit 39. At the same time, the control unit 37 supplies electric power to the second buffer memory 45. Furthermore, the control unit 37 outputs a clock pulse to the image processing unit 38, the coding/decoding unit 39, and the second buffer memory 45. Because of this, the second image processing circuit 36 and the second buffer memory 45 are operated. Afterward, the same processing as that in the first embodiment is performed.

It should be noted that when the output interval T of the image data exceeds the threshold value $T_0$, that is, when continuous shooting at a low frame rate value is performed or when shooting is performed in the still image mode, the second image processing circuit 36 remains in the standby state and no electric power is supplied to the image processing unit 38, the coding/decoding unit 39 of the second image processing circuit 36, and thus, it is made possible to prevent electric power from being wasted. As described above, when the primary battery or the secondary battery is used as a power source device, it is made possible to lengthen the lifetime of these batteries. Furthermore, the second image processing circuit 36 is brought into the standby state, and thus, it is possible to reduce the amount of heat generated from the circuit involved in image processing and to suppress the deformation of the interior of the digital camera and the risk of burn. Moreover, it is possible to keep to a minimum the capacity of the first buffer memory 41 and the first storage region 46 of the first storage region 42, and thus, it is also possible to reduce the total capacity of the buffer memory.

In the present embodiment, the output interval of image data is measured and whether or not the measured output interval of image data exceeds the threshold value is determined, but this is not limited and for example, it may also be possible to measure an output interval of a horizontal synchronizing signal in the imaging element. Furthermore, in addition to the above, it may also be possible to compare the frame rate value with the threshold value using the frame rate value in the continuous shooting mode. In this case, it is also possible to operate the second image processing circuit only in a high continuous shooting mode by providing a plurality of continuous shooting modes the frame rate values of which are different, where the continuous shooting mode at a low frame rate value is referred to as a low continuous shooting mode and the continuous shooting mode at a high frame rate value is referred to a high continuous shooting mode. It should be noted that it is possible to set the frame rate value by the operation of the setting operation unit 55.

In the present embodiment, it is assumed that the processing capacity relating to image processing is the same in the first image processing circuit and the second image processing circuit, but this is not limited. For example, when there are two image processing circuits having different image processing capacities, the image processing circuit having the higher processing capacity relating to image processing is caused to operate at all times and the other image processing circuit is caused to operate based on the output interval of image data.

In the present embodiment, the example is taken, where there are two image processing circuits, that is, the first image processing circuit 31 and the second image processing, circuit 36, but this is not limited and it may also be possible to provide three or more image processing devices and to determine the number of image processing circuits caused to operate based on the output interval of image data.

In the present embodiment, whether or not to operate the second image processing circuit 36 is determined based on the output interval of image data obtained, but it may also be possible to determine whether or not to operate the second image processing circuit 36 based on the output resolution of image data output from the imaging element 16 or the data capacity of the image data in addition to the output interval of the image data. For the output resolution, when the output resolution of the image data is a high resolution that exceeds a predetermined threshold value, the second image processing circuit 36 is caused to operate. For the data capacity of image data, the data capacity is estimated based on the output resolution of the image data and when the data capacity exceeds a predetermined threshold value, the second image processing circuit 36 is caused to operate.

The many features and advantages of the embodiments are apparent from the detailed specification and, thus, it is intended by the appended claimed to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:
1. An electronic camera comprising:
    an imaging unit configured to output an image signal as image data, the image signal being obtained by photoelectrically converting object light; and
    a plurality of image processing units configured to perform image processing on the image data output from the imaging unit, wherein
    when image data having a resolution higher than or equal to a predetermined resolution is output from the imaging unit, the image data is output to at least two image processing units, and
    when image data having a resolution less than the predetermined resolution is output from the imaging unit, the image data is output to one of the image processing units.
2. The electronic camera according to claim 1, wherein
    the plurality of image processing units have a first image processing unit and a second image processing unit, and when first image data and second image data are output from the imaging unit, the first image data is output to the first image processing unit and the second image data is output to the second image processing unit.

3. The electronic camera according to claim 2, wherein the first image data and the second image data have a resolution higher than or equal to the predetermined resolution.

4. The electronic camera according to claim 2, wherein the first image data and the second image data are continuously output from the imaging unit.

5. The electronic camera according to claim 1, wherein when a plurality of image data having a resolution higher than or equal to the predetermined resolution are output from the imaging unit, the plurality of image data are output to at least two image processing units respectively.

6. The electronic camera according to claim 1, further comprising
a selecting unit configured to select a resolution which the image data output from the imaging unit has.

7. An electronic camera comprising:
an imaging unit configured to output an image signal as image data, the image signal being obtained by photo-electrically converting object light; and
a plurality of image processing units configured to perform image processing on the image data output from the imaging unit, wherein
when image data having a data amount more than or equal to a predetermined data amount is output from the imaging unit, the image data is output to at least two image processing units, and
when image data having a data amount less than the predetermined data amount is output from the imaging unit, the image data is output to one of the image processing units.

8. The electronic camera according to claim 7, wherein the plurality of image processing unit have a first image processing unit and a second image processing unit, and
when first image data and second image data are output from the imaging unit, the first image data is output to the first image processing unit and the second image data is output to the second image processing unit.

9. The electronic camera according to claim 8, wherein the first image data and the second image data have a data amount more than or equal to the predetermined data amount.

10. The electronic camera according to claim 8, wherein the first image data and the second image data are continuously output from the imaging unit.

11. The electronic camera according to claim 7, wherein when a plurality of image data having a data amount more than or equal to the predetermined data amount are output from the imaging unit, the plurality of image data are output to at least two image processing units respectively.

12. The electronic camera according to claim 7, further comprising
a selecting unit configured to select a data amount which the image data output from the imaging unit has.

13. An electronic camera comprising:
an imaging unit configured to output an image signal as image data, the image signal being obtained by photo-electrically converting object light; and
a plurality of image processing units configured to perform image processing on the image data output from the imaging unit, wherein
when image data is output from the imaging unit at a frame rate higher than a predetermined frame rate, the image data is output to at least two image processing units, and
when image data is output from the imaging unit at a frame rate lower than the predetermined frame rate, the image data is output to one of the image processing units.

14. The electronic camera according to claim 13, wherein the plurality of image processing units have a first image processing unit and a second image processing unit, and
when first image data and second image data are output from the imaging unit, the first image data is output to the first image processing unit and the second image data is output to the second image processing unit.

15. The electronic camera according to claim 14, wherein the first image data and the second image data are output from the imaging unit at a frame rate higher than the predetermined frame rate.

16. The electronic camera according to claim 14, wherein the first image data and the second image data are continuously output from the imaging unit.

17. The electronic camera according to claim 13, wherein when a plurality of image data are output from the imaging unit at a frame rate higher than the predetermined frame rate, the plurality of image data are output to at least two image processing units respectively.

18. The electronic camera according to claim 13, further comprising
a selecting unit configured to select a frame rate of the imaging unit.

* * * * *